Figure 1:
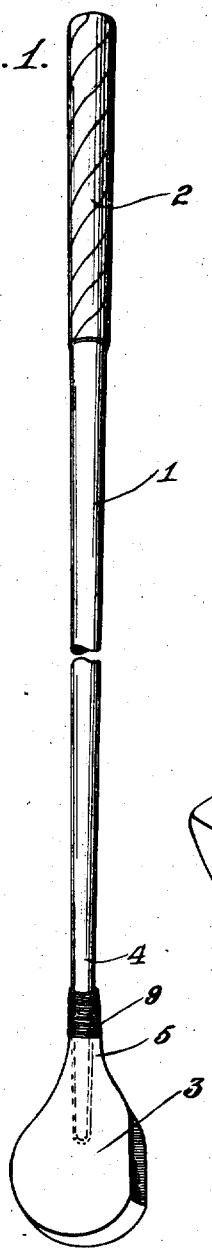

Dec. 6, 1927.

Re. 16,808

P. E. HELLER

GOLF CLUB

Original Filed Oct. 31, 1923

Inventor

Paul E. Heller

By

Attorney

Reissued Dec. 6, 1927. Re. 16,808

UNITED STATES PATENT OFFICE.

PAUL E. HELLER, OF NEWARK, NEW JERSEY.

GOLF CLUB.

Original No. 1,551,563, dated September 1, 1925, Serial No. 671,886, filed October 31, 1923, and in Canada August 3, 1926. Application for reissue filed April 8, 1927. Serial No. 181,911.

This invention relates to golf clubs and has for its object to produce an improved construction which is simple and economical of manufacture and is designed to possess important advantages not present in the types of construction as heretofore proposed and used.

The improvements of the present disclosure are directed more particularly to the construction and arrangement for mounting of the head of the club upon the lower end of the shaft and consists in the provision of a resilient member or sleeve interposed between the lower end portion of the shaft and the heel extension or neck portion of the club head. The resilient member may desirably be in the form of a rubber composition sleeve surrounding the lower end of the shaft and of a length corresponding substantially to the length of the bore in the club head for the reception of the shaft whereby the length of the shaft fitted within the head portion has resilient material interposed between it and the material of the head proper which may be of wood. The rubber sleeve may desirably be under compression and secured in position both to the internal peripheral surface of the bore and likewise to the external peripheral surface of the shaft by a suitable rubber adhesive or cement. The improved construction and mounting of the head upon the shaft thus afforded provides for additional resiliency at the region of the lower end of the shaft and is particularly desirable in its association with a hollow steel shaft as illustrated. In the latter use there is introduced an advantageous elastic rebound of the head portion relative to the shaft from both vertical and torsional or horizontal displacement under impact, this torsional resiliency being to a large degree lacking in steel shaft clubs at present used.

The foregoing and other features and advantages of my improved construction will be better understood by reference to the drawing herewith and to the accompanying description wherein like reference characters are applied to the corresponding parts in the several views.

Figure 2:
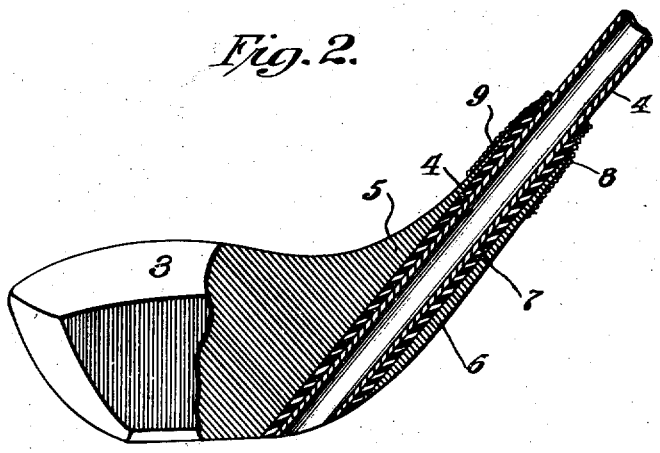

In the drawings:

Fig. 1 is a view in elevation illustrating a club of the driver or brassie type made in accordance with my invention and Fig. 2 is a detail view of the lower portion of the club embodying the features of my invention and shown partially in section.

In the drawings, 1 indicates the usual shaft having the handle portion 2 at its upper extremity and having the usual club head 3 mounted upon the reduced lower end portion 4 of the shaft. The head proper is of approved form having the usual upwardly curved neck portion 5 integrally formed therewith and provided with a longitudinal cylindrical bore 6, the wall of which is slightly tapered or inclined corresponding to the taper of the shaft.

In accordance with the present invention the lower end of the shaft is fitted within the bore and a sleeve of rubber or other suitable resilient material is fitted within the bore throughout the length thereof and interposed between the shaft and the wall of the bore 6 to permit of relative movement and resilient action between the club head and the lower end of the shaft. The resilient sleeve is here illustrated at 7 and extends from the lower end of the bore upwardly for the full length of the bore and projects for a small distance therebeyond. The projecting portion 8 as indicated may desirably be tapered in cross-section to effect a more gradual merging of the lines of the head with that of the shaft at the junction region where the usual securing windings 9 are applied as shown.

In the preferred embodiment of my invention, the resilient or rubber sleeve 7 is of suitable thickness to provide, upon forcing of the shaft within the bore, that the sleeve shall be under an initial or normal compression which materially adds to the holding value and in addition thereto the sleeve is secured within the bore by a suitable adhesive and the adhesive is likewise employed between the internal surface of the sleeve and external surface of the shaft whereby a very durable connection is obtained while allowing for the torsional resilient action between the head and shaft portions. As will be readily understood, in the assembling of my improved structure the resilient sleeve 7 is first inserted and secured within the bore 6 of the club head and the shaft thereafter forced within the sleeve.

I have thus produced a golf club of improved construction wherein the resilient sleeve member introduces an additional and desirable resiliency in the region of the junction between the head of the club and shaft whereby a more effective stroke is obtained in driving. While I have, for the purpose of illustration, shown the wooden head type of club commonly known as drivers and brassies, the features of my invention may be similarly embodied with the many other types of club construction, for instance those having metal heads such as a midiron. As will be further apparent my present invention may be otherwise modified without departing from the spirit thereof. By way of further illustration a wooden shaft may be employed instead of the hollow steel shaft as illustrated.

Having described my invention, I claim:

1. A golf club comprising a shaft and a driving or head member mounted thereon, said head member being formed with a neck or connecting portion having a bore to receive the shaft end, a rubber sleeve fitted within the bore throughout the length thereof and interposed between the circular wall of the bore and the shaft, said sleeve being under compression, substantially as described.

2. A golf club comprising a shaft and a driving or head member mounted thereon, said head member being provided with a neck or connecting portion having a bore to receive the shaft end, a rubber sleeve element fitted within the bore and interposed between the circular wall of the bore and the shaft end, said sleeve being under compression and secured in position by a suitable cement, substantially as described.

3. A golf club comprising a shaft and a driving or head member mounted thereon, said head member being formed with a neck or connecting portion having a bore to receive the shaft end, a resilient sleeve fitted within the bore and secured to the wall of the bore and to the shaft to provide a torsionally yielding and resilient connection between the head and shaft members.

4. A golf club comprising a shaft and a driving or head member mounted thereon, said head member being formed with a neck or connecting portion having a bore to receive the shaft end, a resilient sleeve fitted within the bore and interposed between the wall of the bore and the shaft and being under compression providing a torsionally yielding and resilient connection between the head and shaft members.

5. A golf club comprising a shaft and a driving or head member mounted thereon, said head member being formed with a neck or connecting portion having a bore to receive the shaft end, a rubber sleeve element fitted within the bore and adhesively secured to the wall of the bore and to the shaft and being under compression providing a torsionally yielding and resilient connection between the head and shaft members.

Signed at Newark, in the county of Essex and State of New Jersey this 17 day of February, 1927.

PAUL E. HELLER.